(12) United States Patent
Kaku et al.

(10) Patent No.: US 11,741,724 B2
(45) Date of Patent: Aug. 29, 2023

(54) CONFIGURING A NEURAL NETWORK TO PRODUCE AN ELECTRONIC ROAD MAP THAT HAS INFORMATION TO DISTINGUISH LANES OF A ROAD

(71) Applicant: Toyota Research Institute, Inc., Los Altos, CA (US)

(72) Inventors: Shunsho Kaku, Mountain View, CA (US); Jeffrey M. Walls, Ann Arbor, MI (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 227 days.

(21) Appl. No.: 17/184,773

(22) Filed: Feb. 25, 2021

(65) Prior Publication Data

US 2022/0269891 A1    Aug. 25, 2022

(51) Int. Cl.
| | |
|---|---|
| *G06N 3/08* | (2023.01) |
| *G06F 18/21* | (2023.01) |
| *G06N 3/047* | (2023.01) |
| *G06V 20/56* | (2022.01) |
| *G06V 20/52* | (2022.01) |
| *G06V 30/194* | (2022.01) |

(52) U.S. Cl.
CPC ............ *G06V 20/588* (2022.01); *G06F 18/21* (2023.01); *G06N 3/047* (2023.01); *G06N 3/08* (2013.01); *G06V 20/52* (2022.01); *G06V 30/194* (2022.01)

(58) Field of Classification Search
None
See application file for complete search history.

(56) References Cited

U.S. PATENT DOCUMENTS

| | | | |
|---|---|---|---|
| 2020/0047959 A1 | 2/2020 | Kleyn | |
| 2020/0240790 A1 | 7/2020 | Behrendt et al. | |
| 2020/0324795 A1* | 10/2020 | Bojarski | G06V 20/588 |

(Continued)

FOREIGN PATENT DOCUMENTS

CN    108830182 A    11/2018

OTHER PUBLICATIONS

Zahran et al., "A Modified LBP Method to Extract Features from Color Images," Journal of Theoretical and Applied Information Technology, vol. 96, No. 10, pp. 3014-3024, May 2018.

(Continued)

*Primary Examiner* — Idowu O Osifade
(74) *Attorney, Agent, or Firm* — Christopher G. Darrow; Darrow Mustafa PC

(57) ABSTRACT

A neural network can be configured to produce an electronic road map. The electronic road map can have information to distinguish lanes of a road. A feature in an image can be detected. The image can have been produced at a current time. The image can be of the road. The feature in the image can be determined to correspond to a feature, of a plurality of features, in a feature map. The feature map can have been produced at a prior time from one or more images. A labeled training map can be produced from the feature in the image and the plurality of features in the feature map. The labeled training map can have the information to distinguish the lanes of the road. The neural network can be trained to produce, in response to a receipt of the image and the feature map, the labeled training map.

20 Claims, 10 Drawing Sheets

(56) References Cited

U.S. PATENT DOCUMENTS

2021/0042575 A1* 2/2021 Firner ............... G06V 10/82
2021/0350150 A1* 11/2021 An ................... G06N 3/04

OTHER PUBLICATIONS

Wang et al., "A review of road extraction from remote sensing images," Journal of Traffic and Transportation Engineering, vol. 3, No. 3, pp. 271-282, 2016.

Ghafoorian et al., "EL-GAN: Embedding Loss Driven Generative Adversarial Networks for Lane Detection," Proceedings of the European Conference on Computer Vision (ECCV) Workshops, pp. 1-17, 2018.

Durrant-Whyte et al., "Simultaneous Localisation and Mapping (SLAM): Part I The Essential Algorithms," IEEE Robotics & Automation Magazine, vol. 13, No. 2, pp. 99-110, Jun. 2006.

Tang et al., "Neural Outlier Rejection for Self-Supervised Keypoint Learning," ICLR, pp. 1-14, 2020.

Petroski et al., "Generative Teaching Networks: Accelerating Neural Architecture Search by Learning to Generate Synthetic Training Data," Proceedings of the 37th International Conference on Machine Learning, pp. 9206-9216, 2020.

Loo et al., "DeepRelativeFusion: Dense Monocular SLAM using Single-Image Relative Depth Prediction," pp. 1-8, Jun. 7, 2020.

Vallet et al., "A Multi-Label Convolutional Neural Network for Automatic Image Annotation," Journal of Information Processing, vol. 23, No. 6, pp. 767-775, Nov. 2015.

Urabinahatti et al., "Survey on Feature Extraction and 3D Vision with Respect to ADAS," International Research Journal of Engineering and Technology, vol. 4. No. 6, pp. 1747-1750, Jun. 2017.

Vivacqua et al., "Self-Localization Based on Visual Lane Marking Maps: An Accurate Low-Cost Approach for Autonomous Driving," IEEE Transactions on Intelligent Transportation Systems, vol. 19, No. 2, Feb. 2018.

Wang et al., "DeepVO: Towards End-to-End Visual Odometry with Deep Recurrent Convolutional Neural Networks," 2017 IEEE International Conference on Robotics and Automation (ICRA) Singapore, pp. 2043-2050, 2017.

Andrej Karpathy, "CVPR'20 Workshop on Scalability in Autonomous Driving," Keynote, 4 pages, Jun. 18, 2020.

Unknown, "Markov random filed," pp. 1-7, last accessed Jan. 28, 2021, found at https://en.wikipedia.org/wiki/Markov_random_field.

Zachares et al., "Interpreting contact interactions to overcome failure in robot assembly tasks," pp. 1-8, Jan. 7, 2021.

* cited by examiner

CONFIGURING A NEURAL NETWORK TO PRODUCE AN ELECTRONIC ROAD MAP THAT HAS INFORMATION TO DISTINGUISH LANES OF A ROAD

TECHNICAL FIELD

The disclosed technologies are directed to configuring a neural network to produce an electronic road map that has information to distinguish lanes of a road.

BACKGROUND

An electronic road map can be an electronic representation of a conventional paper road map. If information for an electronic road map is communicated from a server via the World Wide Web, then the electronic road map can be referred to as a web map. An automotive navigation system can use information received from an electronic road map and information received from a global navigation satellite system (GNNS) to produce a turn-by-turn navigation service. A turn-by-turn navigation service can provide a route between an origination point and a destination point. A position of a vehicle determined by a turn-by-turn navigation service can be within a meter of an actual position.

Although such a degree of accuracy can be acceptable for a vehicle operated by a human being, an operation of an autonomous vehicle can require a degree of accuracy that is within a decimeter. Accordingly, efforts to develop autonomous vehicles have been accompanied by efforts to improve the degree of accuracy of electronic road maps. Such efforts have led to the production of high definition maps.

A high definition map can be an electronic road map that includes additional information to improve the degree of accuracy to that required for an autonomous vehicle. A high definition map can be characterized as having layers of additional information. Each layer of additional information can be associated with a specific category of additional information. These layers can include, for example, a base map layer, a geometric map layer, a semantic map layer, a map priors layer, and a real-time knowledge layer. The base map layer, the geometric map layer, and the semantic map layer can include information about static aspects of a location. The map priors layer and the real-time knowledge layer can include information about dynamic aspects of the location. An automotive navigation system can control, via information provided in a high definition map, an operation of an autonomous vehicle.

However, a high definition map can be expensive to produce. For at least this reason, high definition maps may not exist for some locations. Moreover, execution of a high definition map can consume a considerable amount of computational resources.

SUMMARY

In an embodiment, a system for configuring a neural network to produce an electronic road map that has information to distinguish lanes of a road can include a processor and a memory. The memory can store a preliminary processing module and a neural network training module. The preliminary processing module can include instructions that when executed by the processor cause the processor to detect a feature in an image that was produced at a current time. The image can be of the road. The preliminary processing module can include instructions that when executed by the processor cause the processor to determine that the feature in the image corresponds to a feature, of a plurality of features, in a feature map that was produced at a prior time from one or more images. The neural network training module can include instructions that when executed by the processor cause the processor to produce, from the feature in the image and the plurality of features in the feature map, a labeled training map that has the information to distinguish the lanes of the road. The neural network training module can include instructions that when executed by the processor cause the processor to train the neural network to produce, in response to a receipt of the image and the feature map, the labeled training map.

In another embodiment, a method for configuring a neural network to produce an electronic road map that has information to distinguish lanes of a road can include detecting, by a processor, a feature in an image that was produced at a current time. The image can be of the road. The method can include determining, by the processor, that the feature in the image corresponds to a feature, of a plurality of features, in a feature map that was produced at a prior time from one or more images. The method can include producing, by the processor and from the feature in the image and the plurality of features in the feature map, a labeled training map that has the information to distinguish the lanes of the road. The method can include training, by the processor, the neural network to produce, in response to a receipt of the image and the feature map, the labeled training map.

In another embodiment, a non-transitory computer-readable medium for configuring a neural network to produce an electronic road map that has information to distinguish lanes of a road can include instructions that when executed by one or more processors cause the one or more processors to detect a feature in an image that was produced at a current time. The image can be of the road. The non-transitory computer-readable medium can include instructions that when executed by the one or more processors cause the one or more processors to determine that the feature in the image corresponds to a feature, of a plurality of features, in a feature map that was produced at a prior time from one or more images. The non-transitory computer-readable medium can include instructions that when executed by the one or more processors cause the one or more processors to produce, from the feature in the image and the plurality of features in the feature map, a labeled training map that has the information to distinguish the lanes of the road. The non-transitory computer-readable medium can include instructions that when executed by the one or more processors cause the one or more processors to train the neural network to produce, in response to a receipt of the image and the feature map, the labeled training map.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies can cause a neural network to be configured to produce an electronic road map that has information to distinguish lanes of a road. For example, components of the disclosed technologies can be disposed in a vehicle. A feature, in an image that was produced at a current time, can be detected. The image can be of a road. The feature in the image can be determined to correspond to a feature, of a plurality of features, in a feature map that was produced at a prior time from one or more images. For example, the feature map can be produced on the vehicle. Additionally or alternatively, for example, the feature map can be received from a cloud computing platform. The one or more images used to produce the feature map can be received, by the cloud computing platform, from a plurality of vehicles. For example, the image can include another feature that lacks a corresponding other feature in the feature map. A labeled training map can be produced from the features in the image and the plurality of features in the feature map. The labeled training map can have information to distinguish the lanes of the road. The neural network can be trained to produce, in response to a receipt of the image and the feature map, the labeled training map. After the neural network has been trained, the neural network can be executed to produce, in response to a receipt of another image and another corresponding feature map, the electronic road map. The electronic road map can have information to distinguish lanes of a road. For example, prior to such an execution of the neural network, the other image and the other corresponding feature map can be preprocessed so that the neural network can be configured to produce, in response to a receipt of features in the other image and a plurality of features in the other corresponding feature map, the electronic road map.

Figure 1:
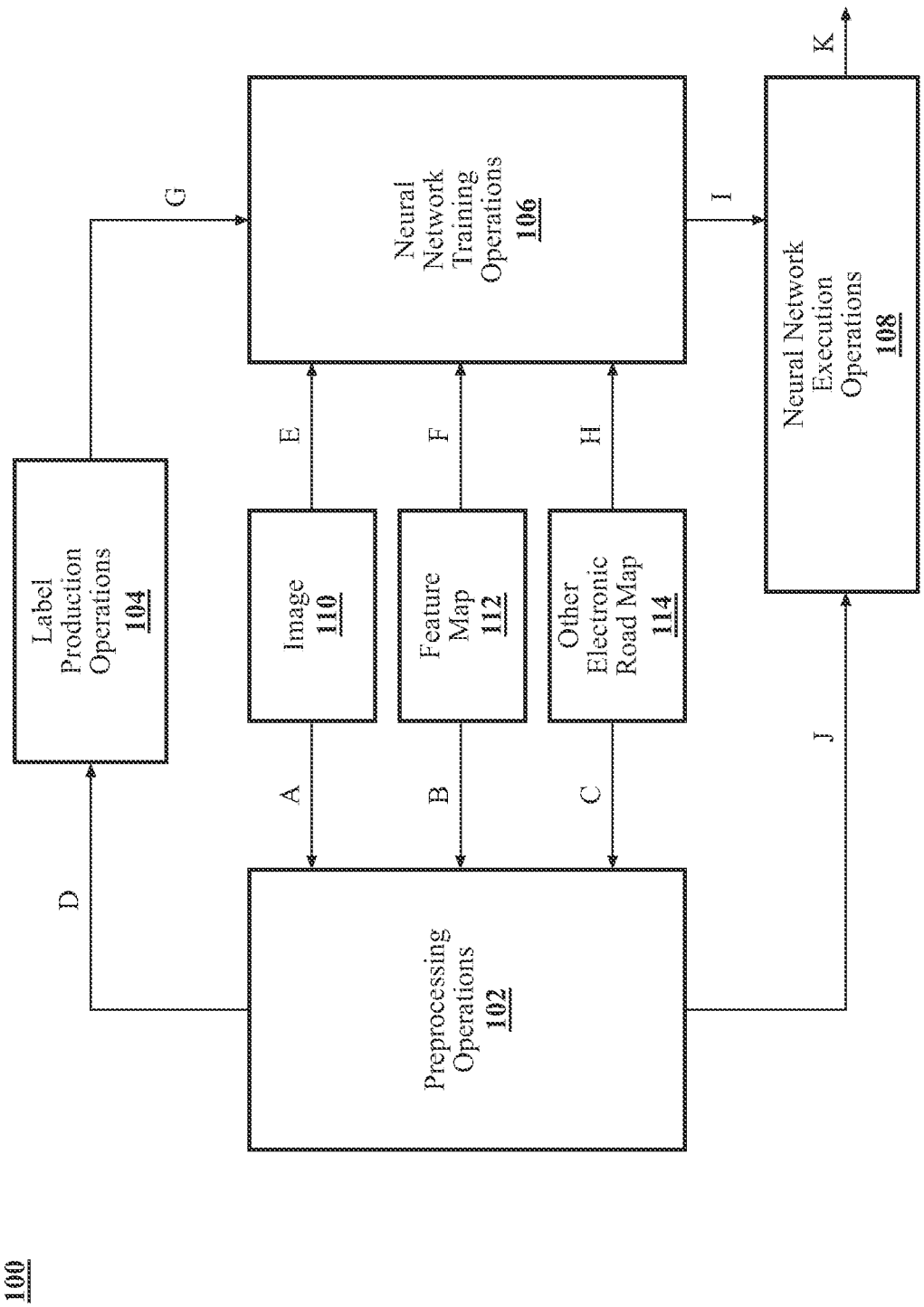
FIG. 1 is a block diagram that illustrates an example of operations for configuring a neural network to produce an electronic road map that has information to distinguish lanes of a road, according to the disclosed technologies.

FIG. 1 is a block diagram that illustrates an example of operations 100 for configuring a neural network to produce an electronic road map that has information to distinguish lanes of a road, according to the disclosed technologies. The operations 100 can include, for example, preprocessing operations 102, labeled production operations 104, and neural network training operations 106. Additionally, for example, the operations 100 can include neural network execution operations 108.

An image 110 can be received (A) by the preprocessing operations 102. The image 110 can be of a road. A feature map 112 can be received (B) by the preprocessing operations 102. A feature in the image 110 can correspond to a feature, of a plurality of features, in the feature map 112. Additionally, for example, another electronic road map 114 can be received (C) by the preprocessing operations 102. The label production operations 104 can receive (D) outputs of the preprocessing operations 102 to produce a labeled training map. The labeled training map can have information to distinguish the lanes of the road. The neural network training operations 106 can receive the image 110 (E), the feature map 112 (F), and the labeled training map (G) to train the neural network to produce, in response to a receipt of the image 110 and the feature map 112, the labeled training map. Additionally, for example, the neural network training operations 106 can receive (H) the other electronic road map 114 to train the neural network to produce, in response to a receipt of the image 110, the feature map 112, and the other electronic road map 114, the labeled training map. Additionally, for example, after the neural network has been trained, the neural network execution operations 108 can receive (I) the neural network. The neural network execution operations 108 can receive (J) the outputs of the preprocessing operations 102 (e.g., for another image) to produce (K) an electronic road map. The electronic road map can have information to distinguish the lanes of a road.

Figure 2:
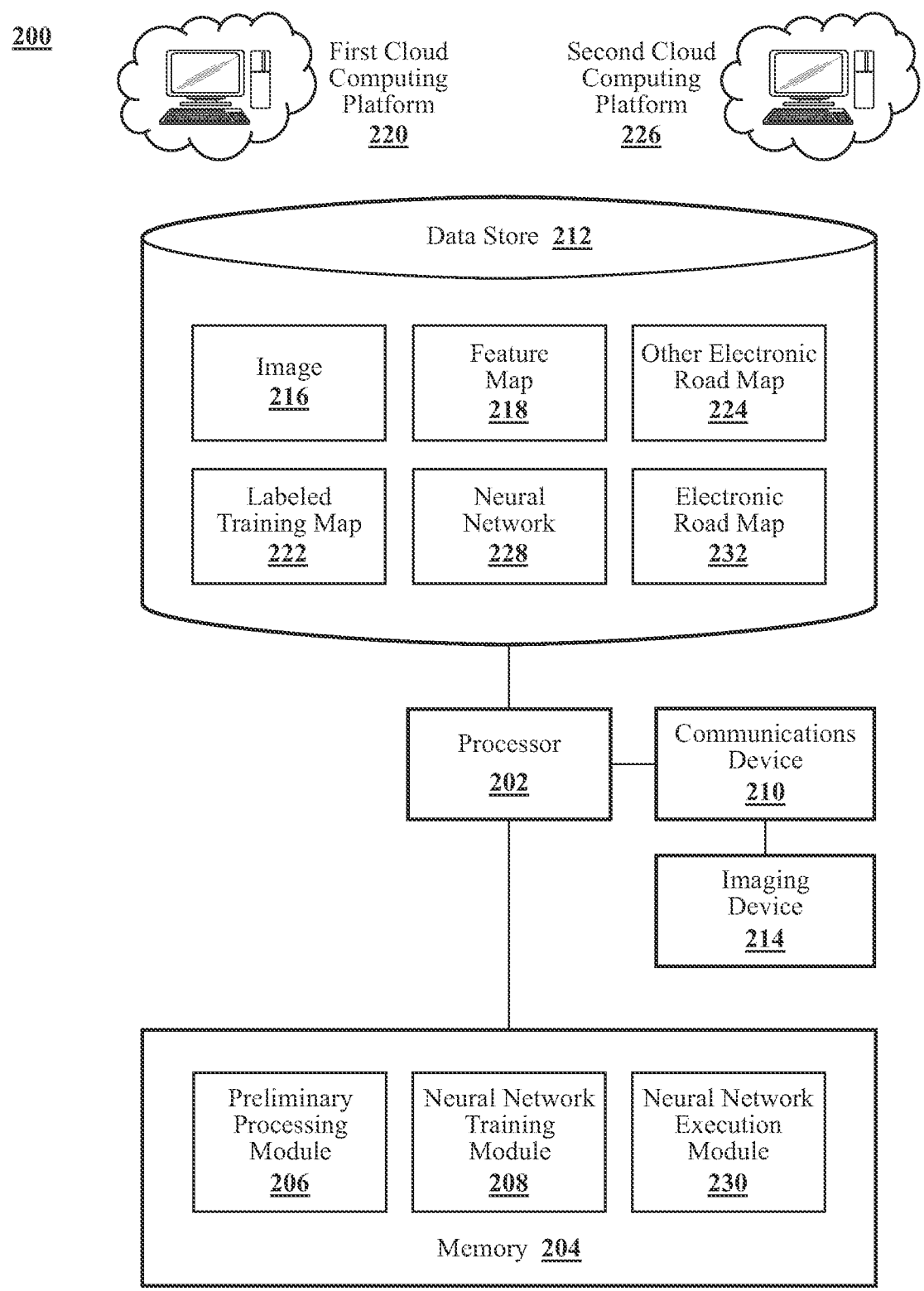
FIG. 2 is a block diagram that illustrates an example of a system for configuring a neural network to produce an electronic road map that has information to distinguish lanes of a road, according to the disclosed technologies.

FIG. 2 is a block diagram that illustrates an example of a system 200 for configuring a neural network to produce an electronic road map that has information to distinguish lanes of a road, according to the disclosed technologies. The system 200 can include, for example, a processor 202 and a memory 204. The memory 204 can be communicably coupled to the processor 202. For example, the memory 204 can store a preliminary processing module 206 and a neural network training module 208.

For example, the system 200 can further include a communications device 210 and a data store 212. The communications device 210 can be communicably coupled to the processor 202. The communications device 210 can be configured to receive, from an imaging device 214, an image 216. The image 216 can be of the road. The image 216 can have been produced at a current time. For example, the imaging device 214 can be disposed on a vehicle. For example, the imaging device 214 can include one or more of a front-facing camera or a side-facing camera. The data store 212 can be communicably coupled to the processor 202. The data store 212 can be configured to store the image 216.

Figure 3:
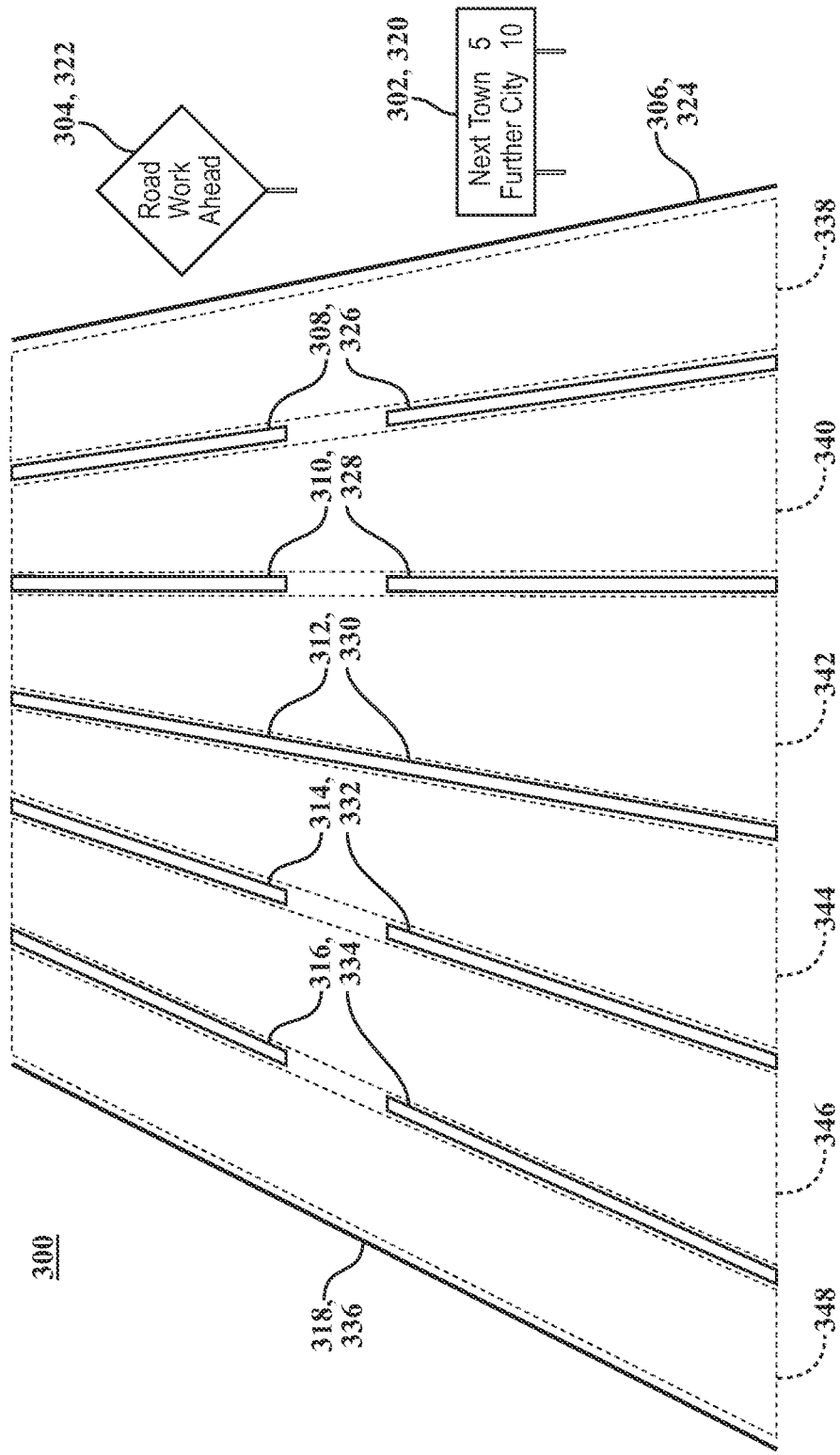
FIG. 3 is a diagram that illustrates an example of an image of a road, according to the disclosed technologies.

FIG. 3 is a diagram that illustrates an example of an image 300 of a road, according to the disclosed technologies. The image 300 can include, for example, a first feature 302, a second feature 304, a third feature 306, a fourth feature 308, a fifth feature 310, a sixth feature 312, a seventh feature 314, an eighth feature 316, and a ninth feature 318. For example, the first feature 302 can be a guide sign 320. For illustrative purposes, the guide sign 320 can include information that indicates that: (1) Next Town is located a distance of five miles from the guide sign 320 and (2) Further City is located a distance of ten miles from the guide sign 320. For example, the second feature 304 can be a temporary traffic control sign 322. For illustrative purposes, the temporary traffic control sign 322 can include information that indicates that there is Road Work Ahead. For example, the third feature 306 can be a curb 324 for a point-of-view traffic portion of the road. For example, the fourth feature 308 can be a lane marker 326 between a point-of-view traffic right lane and a point-of view traffic center lane. For example, the fifth feature 310 can be a lane maker 328 between the point-of-view traffic center lane and a point-of-view traffic left lane. For example, the sixth feature 312 can be a lane marker 330 for a center line. For example, the seventh feature 314 can be a lane marker 332 between an oncoming traffic left lane and an oncoming traffic center lane. For example, the eighth feature 316 can be a lane marker 334 between the oncoming traffic center lane and an oncoming traffic right lane. For example, the ninth feature 318 can be a curb 336 for an oncoming traffic portion of the road.

Returning to FIG. 2, the preliminary processing module 206 can include instructions that function to control the processor 202 to detect a feature in the image 216. For example, the feature can be detected by executing a semantic segmentation neural network. For example: (1) the image 216 can be the image 300 illustrated in FIG. 3 and (2) the feature can be the first feature 302 (e.g., the guide sign 320) illustrated in FIG. 3.

For example: (1) the data store 212 can be configured to store a feature map 218 and (2) the preliminary processing module 206 can include instructions that function to control the processor 202 to obtain the feature map 218. The feature map 218 can have been produced at a prior time (i.e., at a time prior to the current time) from one or more images.

For example: (1) the data store 212 can be disposed on a vehicle and (2) the preliminary processing module 206 can include instructions that function to control the processor 202 to obtain the feature map 218 at a time in which there is a lack of a production of a propulsion force for the vehicle. For example, the instructions to obtain the feature map 218 can obtain the feature map 218 at night when the vehicle is not in operation (i.e., a time in which there is a lack of a production of a propulsion force for the vehicle).

For example: (1) the processor 202 and the data store 212 can be disposed on a vehicle and (2) the instructions to obtain the feature map 218 can include instructions that cause the processor 202 to produce the feature map 218. For example, the processor 202 can produce the feature map 218 from images produced by the imaging device 214.

Additionally or alternatively, for example: (1) the communications device 210 can be configured to receive, from a first cloud computing platform 220, the feature map 218 and (2) the instructions to obtain the feature map 218 can include instructions that cause the processor 202 to receive, from the first cloud computing platform 220, the feature map 218. For example, the one or more images used to produce the feature map 218 can have been received, by the first cloud computing platform 220, from a plurality of vehicles. That is, the first cloud computing platform 220 can produce the feature map 218 via a crowdsourcing process.

Figure 4:
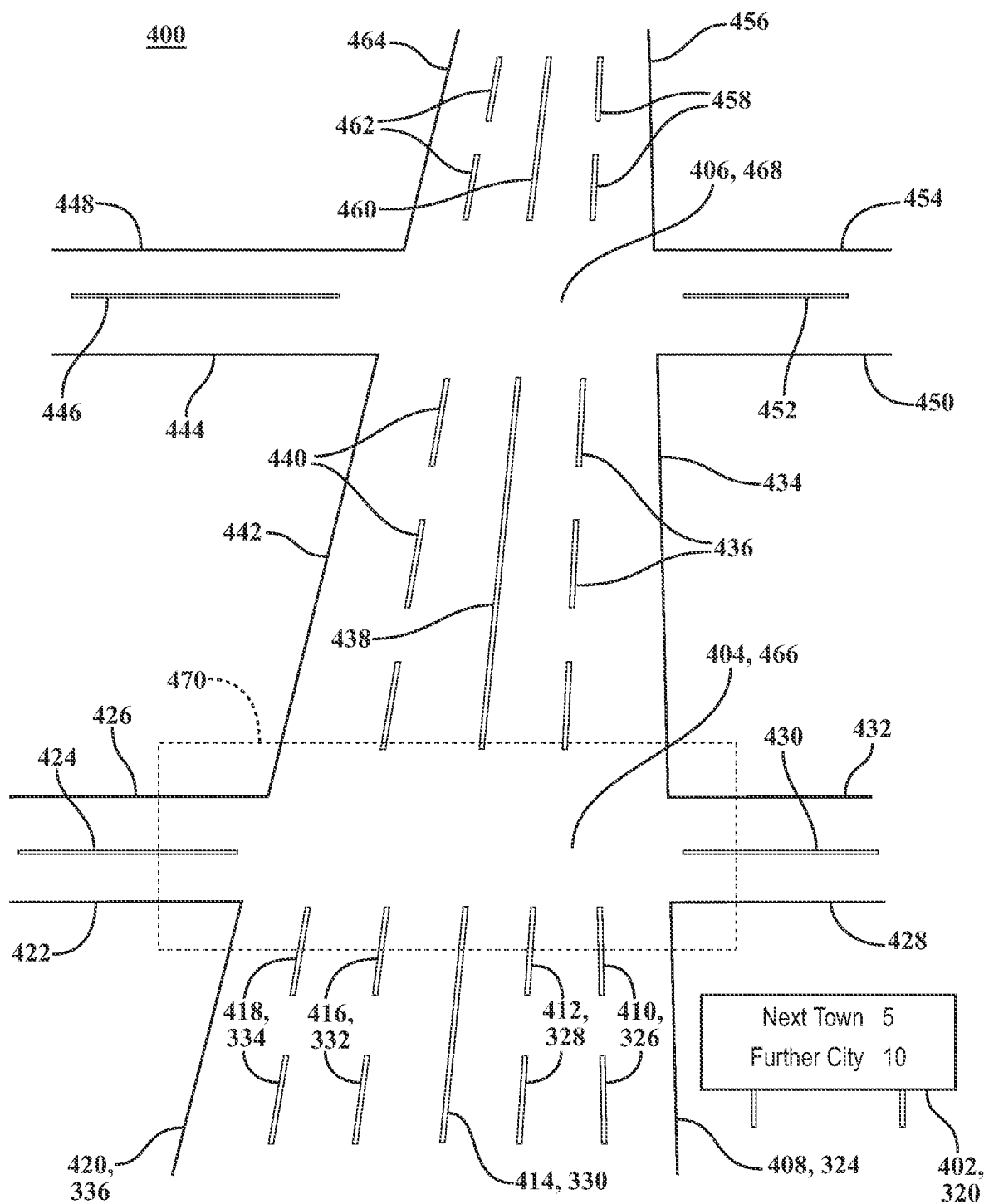
FIG. 4 is a diagram that illustrates an example of a feature map, according to the disclosed technologies.

FIG. 4 is a diagram that illustrates an example of a feature map 400, according to the disclosed technologies. The feature map 400 can include, for example, a first feature 402, a second feature 404, a third feature 406, a fourth feature 408, a fifth feature 410, a sixth feature 412, a seventh feature 414, an eighth feature 416, a ninth feature 418, a tenth feature 420, an eleventh feature 422, a twelfth feature 424, a thirteenth feature 426, a fourteenth feature 428, a fifteenth feature 430, a sixteenth feature 432, a seventeenth feature 434, an eighteenth feature 436, a nineteenth feature 438, a twentieth feature 440, a twenty-first feature 442, a twenty-second feature 444, a twenty-third feature 446, a twenty-fourth feature 448, a twenty-fifth feature 450, a twenty-sixth feature 452, a twenty-seventh feature 454, a twenty-eighth feature 456, a twenty-ninth feature 458, a thirtieth feature 460, a thirty-first feature 462, and a thirty-second feature 464.

For example, the first feature 402 can be the guide sign 320. For example, the second feature 404 can be an intersection 466 between the road and a first cross road. For example, the third feature 406 can be an intersection 468 between the road and second cross road.

For example, the fourth feature 408 can be the curb 324. For example, the fifth feature 410 can be the lane marker 326. For example, the sixth feature 412 can be the lane maker 328. For example, the seventh feature 414 can be the lane marker 330. For example, the eighth feature 416 can be the lane marker 332. For example, the ninth feature 418 can be the lane marker 334. For example, tenth feature 420 can be the curb 336.

For example, the eleventh feature 422 can be a curb for a left-to-right traffic portion of the first cross road left of the intersection 466. For example, the twelfth feature 424 can be a center line of the first cross road left of the intersection 466. For example, the thirteenth feature 426 can be a curb for a right-to-left traffic portion of the first cross road left of the intersection 466.

For example, the fourteenth feature 428 can be a curb for the left-to-right traffic portion of the first cross road right of the intersection 466. For example, the fifteenth feature 430 can be a center line of the first cross road right of the intersection 466. For example, the sixteenth feature 432 can be a curb for the right-to-left traffic portion of the first cross road right of the intersection 466.

For example, the seventeenth feature 434 can be a curb for the point-of-view traffic portion of the road between the intersection 466 and the intersection 468. For example, the eighteenth feature 436 can be a lane marker between the point-of-view traffic right lane and the point-of-view traffic left lane between the intersection 466 and the intersection 468. For example, the nineteenth feature 438 can be a lane marker for a center line of the road between the intersection 466 and the intersection 468. For example, the twentieth feature 440 can be a lane marker between the oncoming traffic left lane and the oncoming traffic right lane between the intersection 466 and the intersection 468. For example, the twenty-first feature 442 can be a curb for the oncoming traffic portion of the road between the intersection 466 and the intersection 468.

For example, the twenty-second feature 444 can be a curb for a left-to-right traffic portion of the second cross road left of the intersection 468. For example, the twenty-third feature 446 can be a center line of the second cross road left of the intersection 468. For example, the twenty-fourth feature 448 can be a curb for a right-to-left traffic portion of the second cross road left of the intersection 468.

For example, the twenty-fifth feature 450 can be a curb for the left-to-right traffic portion of the second cross road right of the intersection 468. For example, the twenty-sixth feature 452 can be a center line of the second cross road right of the intersection 468. For example, the twenty-seventh feature 454 can be a curb for the right-to-left traffic portion of the second cross road right of the intersection 468.

For example, the twenty-eighth feature 456 can be a curb for the point-of-view traffic portion of the road beyond the intersection 468. For example, the twenty-ninth feature 458 can be a lane marker between the point-of-view traffic right lane and the point-of-view traffic left lane beyond the intersection 468. For example, the thirtieth feature 460 can be a lane marker for a center line of the road beyond the intersection 468. For example, the thirty-first feature 462 can be a lane marker between the oncoming traffic left lane and the oncoming traffic right lane beyond the intersection 468. For example, the thirty-second feature 464 can be a curb for the oncoming traffic portion of the road beyond the intersection 468.

Returning to FIG. 2, the preliminary processing module 206 can include instructions that function to control the processor 202 to determine that the feature in the image 216 corresponds to a feature, of a plurality of features, in the feature map 218. For example: (1) the feature in the image 216 can be the first feature 302 (e.g., the guide sign 320) illustrated in FIG. 3 and (2) the feature in the feature map 218 can be the first feature 402 (e.g., the guide sign 320) illustrated in FIG. 4.

Additionally, for example, the preliminary processing module 206 can include instructions that function to control the processor 202 to: (1) determine, based on the feature in the image 216, a region of interest for the feature map 218 and (2) query, based on the region of interest, the feature map 218 to determine the plurality of features.

With reference to FIGS. 2-4, for example, the preliminary processing module 206 can: (1) determine, based on the first feature 302 (e.g., the guide sign 320) (which corresponds to the first feature 402 (e.g., the guide sign 320)), a region of interest 470 for the feature map 400 and (2) query, based on the region of interest 470, the feature map 400 to determine the plurality of features. For example, the plurality of feature can include the first feature 402, the second feature 404, the third feature 406, the fourth feature 408, the fifth feature 410, the sixth feature 412, the seventh feature 414, the eighth feature 416, the ninth feature 418, the tenth feature 420, the eleventh feature 422, the twelfth feature 424, the thirteenth feature 426, the fourteenth feature 428, the fifteenth feature 430, the sixteenth feature 432, the seventeenth feature 434, the eighteenth feature 436, the nineteenth feature 438, the twentieth feature 440, and the twenty-first feature 442.

For example, the image 216 can include a feature that lacks a corresponding feature in the feature map 218. For example, the image 300 can include the second feature 304 (e.g., the temporary traffic control sign 322) that lacks a corresponding feature in the feature map 400. That is, because the image 216 can have been produced at a current time while the feature map 218 can have been produced at a prior time (i.e., at a time prior to the current time), the image 216 can include a feature that lacks a corresponding feature in the feature map 218.

Returning to FIG. 2, for example: (1) the data store 212 can be disposed on a vehicle and (2) the instructions to query the feature map 218 can include instructions that function to control the processor 202 to query the feature map 218 at a time in which there is a lack of a production of a propulsion force for the vehicle. For example, the instructions to query the feature map 218 can query the feature map 218 at night when the vehicle is not in operation (i.e., a time in which there is a lack of a production of a propulsion force for the vehicle).

The neural network training module 208 can include instructions that function to control the processor 202 to produce, from the feature in the image 216 and the plurality of features in the feature map 218, a labeled training map 222. The labeled training map 222 can have information to distinguish lanes of the road. For example, the labeled training map 222 can include one or more of: (1) a polyline representation of a boundary of a lane of the road, (2) a measure of a spatial uncertainty of the polyline, (3) a degree of confidence of an estimation of the boundary of the lane of the road, (4) a probabilistic grid map of the lane of the road, or (5) the like. For example, the data store 212 can be configured to store the labeled training map 222.

Figure 5:
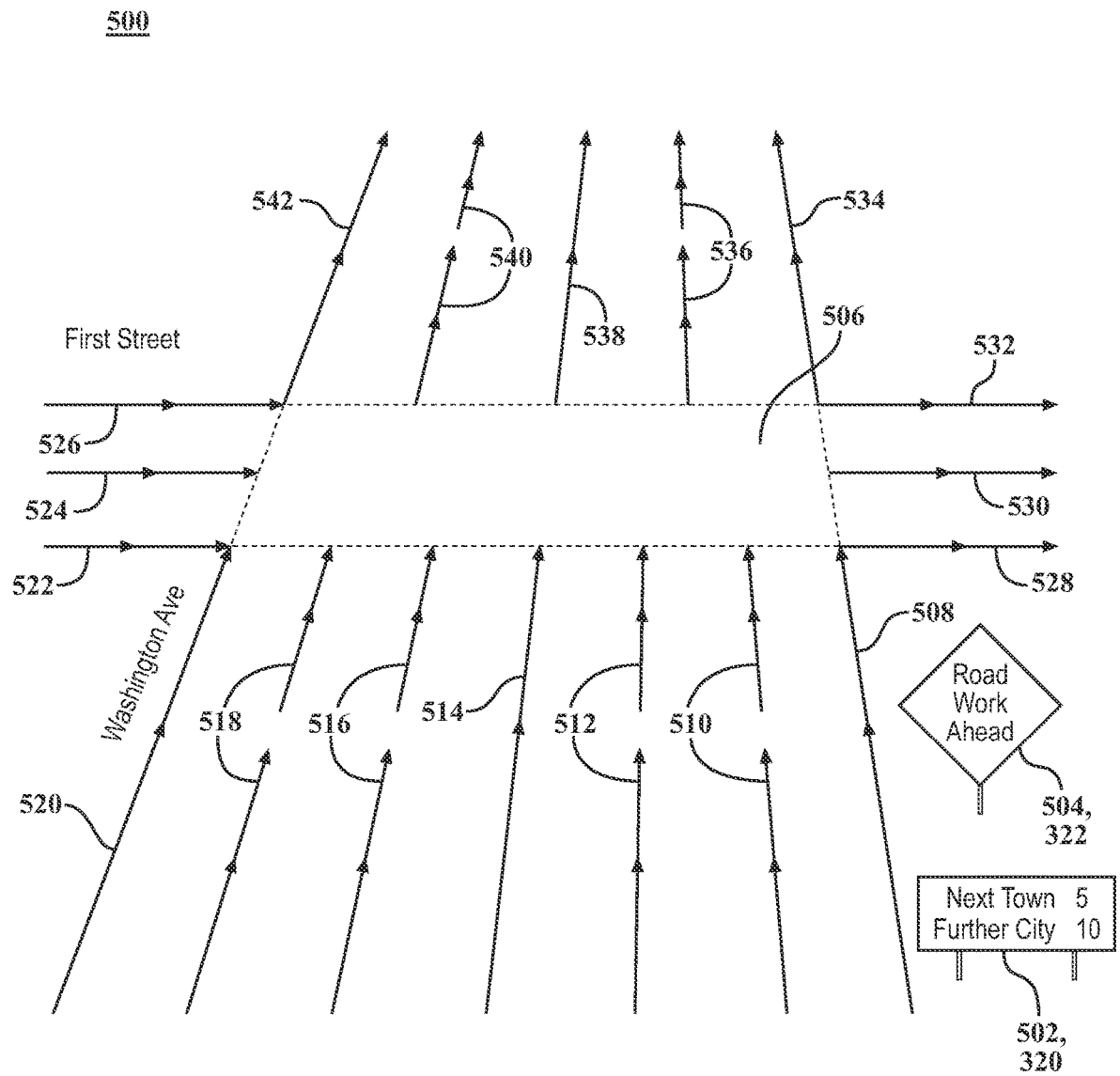
FIG. 5 is a diagram that illustrates an example of a labeled training map, according to the disclosed technologies.

FIG. 5 is a diagram that illustrates an example of a labeled training map 500, according to the disclosed technologies. The labeled training map 500 can include, for example, a first object 502, a second object 504, a third object 506, a fourth object 508, a fifth object 510, a sixth object 512, a seventh object 514, an eighth object 516, a ninth object 518, a tenth object 520, an eleventh object 522, a twelfth object 524, a thirteenth object 526, a fourteenth object 528, a fifteenth object 530, a sixteenth object 532, a seventeenth object 534, an eighteenth object 536, a nineteenth object 538, a twentieth object 540, and a twenty-first object 542.

For example, the first object 502 can be for the guide sign 320. For example, the second object 504 can be for the temporary traffic control sign 322. For example, the third object 506 can be for the intersection 466.

For example, the fourth object 508 can be for a right boundary of the point-of-view traffic right lane (e.g., the curb 324). For example, the fifth object 510 can be for a boundary between the point-of-view traffic right lane and the point-of-view traffic center lane (e.g., the lane marker 326). For example, the sixth object 512 can be for a boundary between the point-of-view traffic center lane and the point-of-view traffic left lane (e.g., the lane marker 328). For example, the seventh object 514 can be for a boundary between the point-of-view traffic left lane and the oncoming traffic left lane (e.g., the lane marker 330). For example, the eighth object 516 can be for a boundary between the oncoming traffic left lane and the oncoming traffic center lane (e.g., the lane marker 332). For example, the ninth object 518 can be for a boundary between the oncoming traffic center lane and the oncoming traffic right lane (e.g., the lane marker 334). For example, the tenth object 520 can be for a right boundary of the oncoming traffic right lane (e.g., the curb 336).

For example, the eleventh object 522 can be for a right boundary of the left-to-right traffic portion of the first cross road left of the intersection 466. For example, the twelfth object 524 can be for a boundary between the left-to-right traffic portion of the first cross road left of the intersection 466 and the right-to-left traffic portion of the first cross road left of the intersection 466. For example, the thirteenth object 526 can be for a right boundary of the right-to-left traffic portion of the first cross road left of the intersection 466.

For example, the fourteenth object 528 can be for a right boundary of the left-to-right traffic portion of the first cross road right of the intersection 466. For example, the fifteenth object 530 can be for a boundary between the left-to-right traffic portion of the first cross road right of the intersection 466 and the right-to-left traffic portion of the first cross road right of the intersection 466. For example, the sixteenth object 532 can be for a right boundary of the right-to-left traffic portion of the first cross road right of the intersection 466.

For example, the seventeenth object 534 can be for a right boundary of the point-of-view traffic right lane beyond the intersection 466. For example, the eighteenth object 536 can be for a boundary between the point-of-view traffic right lane and the point-of-view traffic left lane beyond the intersection 466. For example, the nineteenth object 538 can be for a boundary between the point-of-view traffic left lane and the oncoming traffic left lane beyond the intersection 466. For example, the twentieth object 540 can be for a boundary between the oncoming traffic left lane and the oncoming traffic right lane beyond the intersection 466. For example, the twenty-first object 542 can be for a right boundary of the oncoming traffic right lane beyond the intersection 466.

For example, one or more of the fourth object 508, the fifth object 510, the sixth object 512, the seventh object 514, the eighth object 516, the ninth object 518, the tenth object 520, the eleventh object 522, the twelfth object 524, the thirteenth object 526, the fourteenth object 528, the fifteenth object 530, the sixteenth object 532, the seventeenth object 534, the eighteenth object 536, the nineteenth object 538, the twentieth object 540, or the twenty-first object 542 can be represented by a polyline. For example, in the labeled training map 500, the lanes of the roads can be represented by a probabilistic grid map.

Figure 6:
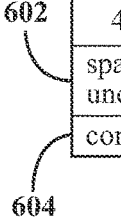
FIG. 6 is a set of tables of an example of information associated with objects included in the labeled training map, according to the disclosed technologies.

FIG. 6 is a set of tables 600 of an example of information associated with objects included in the labeled training map 500, according to the disclosed technologies. For example, the set of tables 600 can include, for each of the fourth object 508, the fifth object 510, the sixth object 512, the seventh object 514, the eighth object 516, the ninth object 518, the tenth object 520, the eleventh object 522, the twelfth object 524, the thirteenth object 526, the fourteenth object 528, the fifteenth object 530, the sixteenth object 532, the seventeenth object 534, the eighteenth object 536, the nineteenth object 538, the twentieth object 540, and the twenty-first object 542: (1) a measure of a spatial uncertainty 602 of the polyline used to represent a boundary of a lane of a corresponding road and (2) a degree of confidence 604 of an estimation of the boundary of the lane of the corresponding road.

Returning to FIG. 2, in a first implementation: (1) the preliminary processing module 206 can further include instructions that function to control the processor 202 to produce a segmentation of the image 216 to distinguish the lanes of the road and (2) the instructions to produce the labeled training map 222 can include instructions that cause the processor 202 to produce, from information about the segmentation, the labeled training map 222. For example, the instructions to produce the segmentation can include instructions that cause the processor 202 to execute a neural network-based classifier to produce the segmentation.

With reference to FIG. 3, the image 300 can further include, for example, a first segment 338, a second segment 340, a third segment 342, a fourth segment 344, a fifth segment 346, and a sixth segment 348. For example, the first segment 338 can distinguish the point-of-view traffic right lane. For example, the second segment 340 can distinguish the point-of view traffic center lane. For example, the third segment 342 can distinguish the point-of-view traffic left lane. For example, the fourth segment 344 can distinguish the oncoming traffic left lane. For example, the fifth segment 346 can distinguish the oncoming traffic center lane. For example, the sixth segment 348 can distinguish the oncoming traffic right lane.

Returning to FIG. 2, in a second implementation, the instructions to produce the labeled training map 222 can include instructions that cause the processor 202 to produce, from another electronic road map 224, the labeled training map 222. For example, the other electronic road map 224 may lack information to distinguish the lanes of the road. Additionally or alternatively, for example, the other electronic road map 224 can include a high definition map. That is, if a location at which the image 216 was produced is a location for which a high definition map exists, then the other electronic road map 224 can include the high definition map. For example: (1) the communications device 210 can be configured to receive, from a second cloud computing platform 226, the other electronic road map 224 and (2) the data store 212 can be configured to store the other electronic road map 224.

Figure 7:
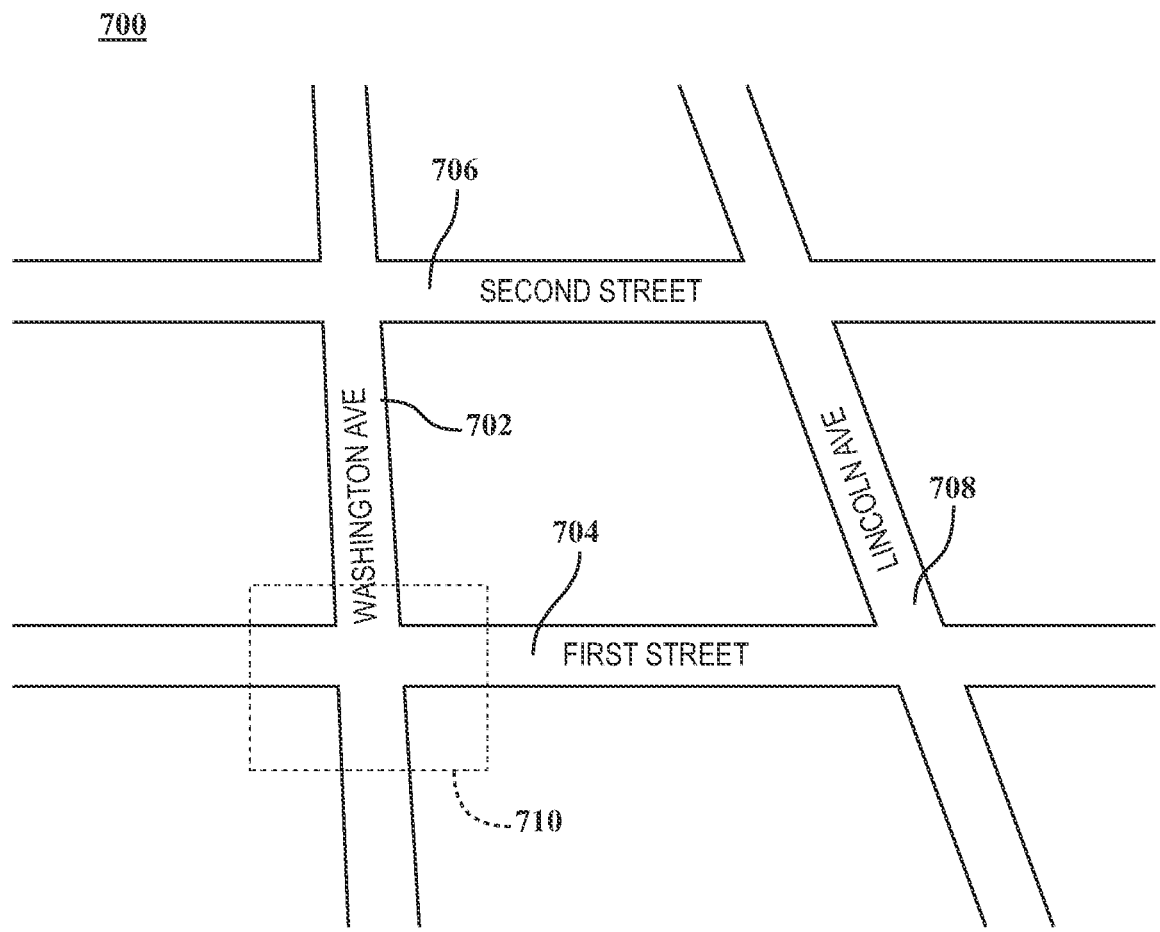
FIG. 7 is a diagram that illustrates an example of another electronic road map, according to the disclosed technologies.

FIG. 7 is a diagram that illustrates an example of another electronic road map 700, according to the disclosed technologies. The other electronic road map 700 can include, for example, a representation of the road 702, a representation of the first cross road 704, a representation of the second cross road 706, and a representation of another road 708. For example, the other electronic road map 700 can be used to provide routing information, such as a turn-by-turn navigation system, through a network of roads. For example, the other electronic road map 700 can include names associated with the road, the first cross road, the second cross road, and the other road. However, for example, the other electronic road map 700 may lack information to distinguish the lanes of a road.

Returning to FIG. 2, additionally, for example, the preliminary processing module 206 can include instructions that function to control the processor 202 to: (1) determine a location of the processor 202 and (2) determine, based on the location, a region of interest for the other electronic road map 224. The instructions to produce, from the other electronic road map 224, the labeled training map 222 can include instructions that cause the processor 202 to produce, from the region of interest for the other electronic road map 224, the labeled training map 222.

With reference to FIGS. 2, 4, and 7, for example, the preliminary processing module 206 can: (1) determine that a location of the processor 202 is near to the intersection 466 and (2) determine, based on the location, a region of interest 710 for the other electronic road map 700.

Returning to FIG. 2, in a third implementation, the instructions to produce the labeled training map 222 can include instructions that cause the processor 202 to: (1) produce a potential of an estimation of boundaries of the lanes of the road, (2) produce, based on the potential, the estimation of the boundaries of the lanes of the road, and (3) produce, based on one or more criteria, an evaluation of the estimation of the boundaries of the lanes of the road.

For example, the instructions to produce the estimation of the boundaries of the lanes of the road can include instructions that cause the processor 202 to: (1) determine that a relationship, among one or more of the features in the image 216 or one or more features of the plurality of features in the feature map 218, is expressible as a random field and (2) determine that the random field has one or more Markov properties.

For example, the one or more criteria can include one or more of: (1) a count of members of a set of differences being greater than a count threshold, (2) a degree of curvature of a curve, represented by one or more of the boundaries of the lanes of the road, being within a threshold degree of curvature, (3) a width of a lane, represented by one or more of the boundaries of the lanes of the road, being between a first threshold width and a second threshold width, (4) a position of one or more of the boundaries of the lanes of the road, at a first time, being the position of the one or more of the boundaries of the lanes of the road at a second time (i.e., temporal stability), or (5) the like. The members of the set of differences can be differences between first positions and second positions that are within a distance threshold. The first positions can be of the boundaries of the lanes of the road. The second positions can be of one or more of the features in the image 216 or one or more features of the plurality of features in the feature map 218.

For example, the instructions to produce the labeled training map 222 can include instructions that cause the processor 202 to associate, based on the evaluation, a portion of the boundaries of the lanes of the road with a probability about a degree of accuracy of a position of the portion of the boundaries of the lanes of the road. Additionally, for example, the instructions to produce the labeled training map 222 can further include instructions that cause the processor 202 to remove, in response to the probability being less than a probability threshold, the portion of the boundaries of the lanes of the road.

The neural network training module 208 can include instructions that function to control the processor 202 to train a neural network 228 to produce, in response to a receipt of the image 216 and the feature map 218, the labeled training map 222. In the second implementation, the instructions to train the neural network 228 can include instructions that function to control the processor 202 to train the neural network 228 to produce, in response to a receipt of the other electronic road map 224, the labeled training map 222. For example, the data store 212 can be configured to store the neural network 228.

In a fourth implementation, the memory 204 can further store a neural network execution module 230. The neural network execution module 230 can include instructions that function to control the processor 202 to execute the neural network 228 to produce an electronic road map 232. The electronic road map 232 can have information to distinguish lanes of a road. For example, the data store 212 can be configured to store the electronic road map 232.

Additionally, for example, the preliminary processing module 206 can further include instructions that function to control the processor 202 to preprocess, prior to an execution of the neural network 228, the image 216 and the feature map 218. In the second implementation, the instructions to preprocess can include instructions that function to control the processor 202 to preprocess, prior to the execution of the neural network 228, the other electronic road map 224.

For example, the instructions to preprocess the image 216 and the feature map 218 can include instructions that function to control the processor 202 to: (1) determine, based on the feature in the image 216, a region of interest for the feature map 218 and (2) query, based on the region of interest, the feature map 218 to determine the plurality of features. The instructions to execute the neural network 228 to produce the electronic road map 232 can include instructions that function to control the processor 202 to execute the neural network 228 to produce, in response to a receipt of the feature in the image 216 and the plurality of features in the feature map 218, the electronic road map 232.

Additionally, for example, the instructions to preprocess the image 216 can further include instructions that function to control the processor 202 to produce a segmentation of the image 216 to distinguish the lanes of the road. The instructions to execute the neural network 228 to produce the electronic road map 232 can further include instructions that function to control the processor 202 to execute the neural network 228 to produce, in response to a receipt of information about the segmentation, the electronic road map 232.

Alternatively or additionally, for example, the preliminary processing module 206 can further includes instructions that function to control the processor 202 to: (1) determine a location of the processor 202 and (2) determine, based on the location, a region of interest for the other electronic road map 224. The instructions to execute the neural network 228 to produce the electronic road map 232 can further include instructions that function to control the processor 202 to execute the neural network 228 to produce, in response to a receipt of information about the region of interest for the other electronic road map 224, the electronic road map 232.

Figure 8A:
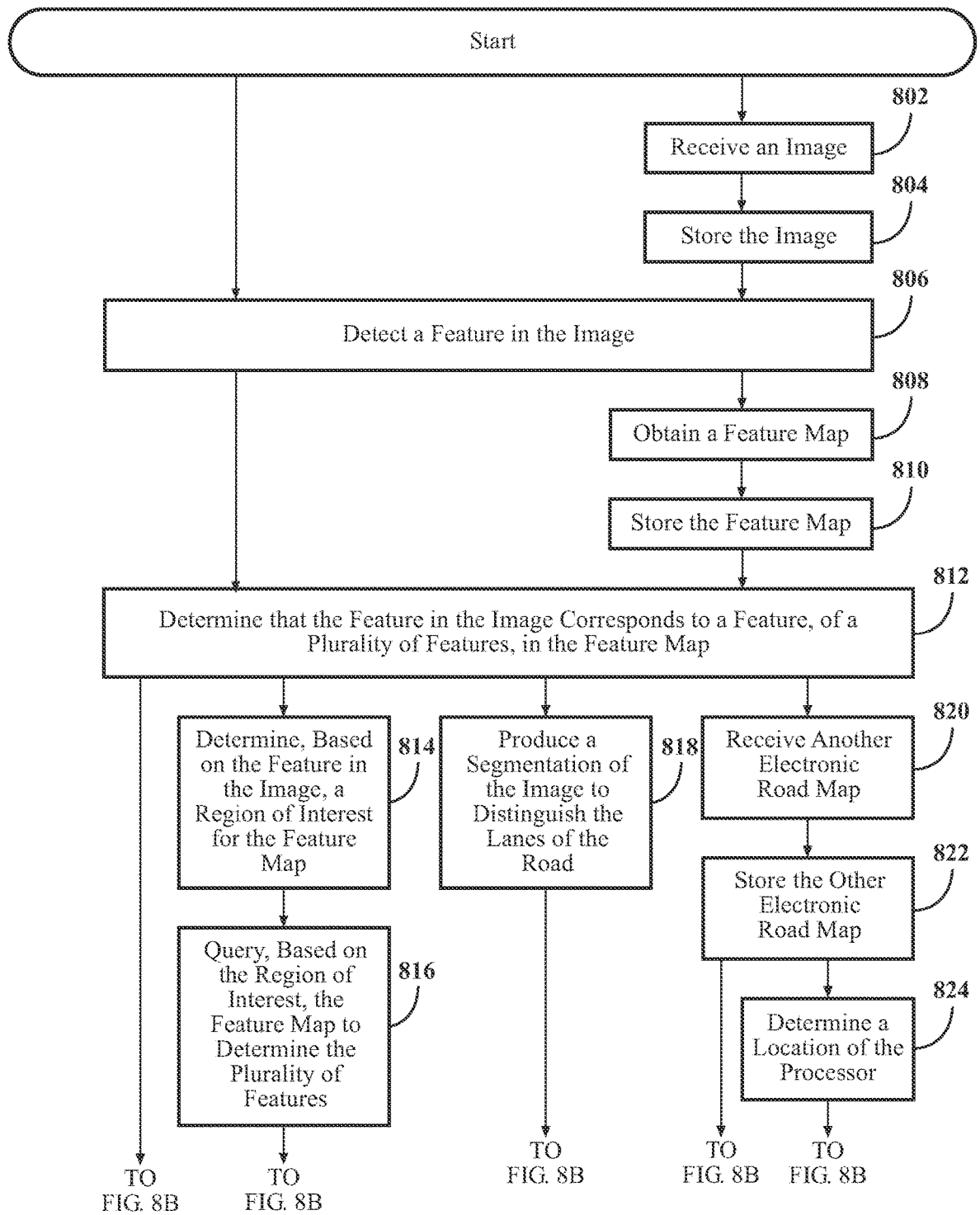
FIGS. 8A and 8B include a flow diagram that illustrates an example of a method that is associated with configuring a neural network to produce an electronic road map that has information to distinguish lanes of a road, according to the disclosed technologies.
Figure 8B:
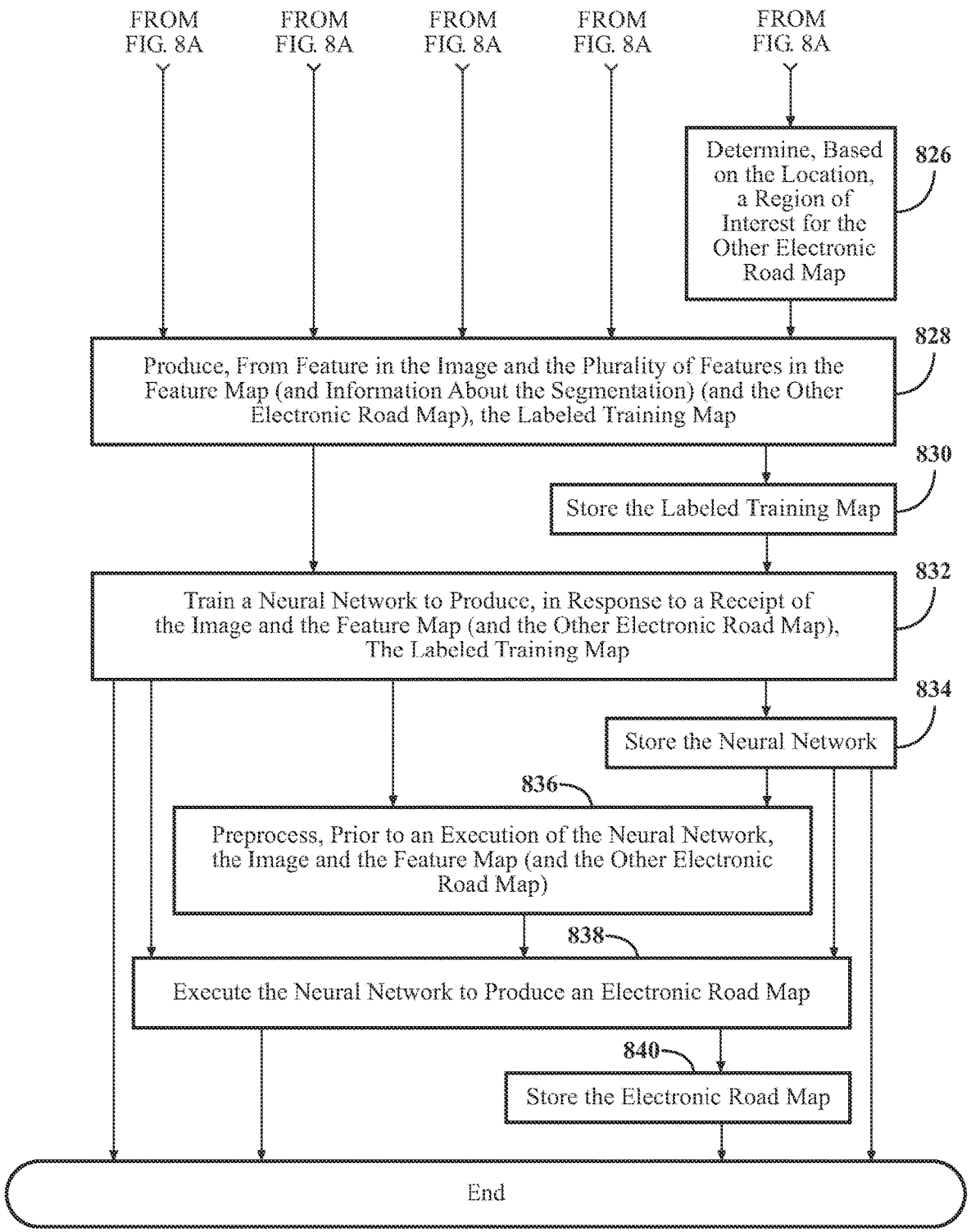

FIGS. 8A and 8B include a flow diagram that illustrates an example of a method 800 that is associated with configuring a neural network to produce an electronic road map that has information to distinguish lanes of a road, according to the disclosed technologies. The method 800 is described from the perspective of the system 200 illustrated in FIG. 2. Although the method 800 is described in combination with the system 200, one of skill in the art understands, in light of the description herein, that the method 800 is not limited to being implemented by the system 200. Rather, the system 200 is an example of a system that may be used to implement the method 800. For example, the method 800 can be performed by an autonomous mobile agent. For example, the autonomous mobile agent can include an autonomous vehicle, a mobile robot, or the like.

In FIG. 8A, in the method 800, at an operation 802, for example, the image 216 can be received, by the communications device 210, from the imaging device 214. The image 216 can be of the road. The image 216 can have been produced at a current time. For example, the imaging device 214 can be disposed on a vehicle. For example, the imaging device 214 can include one or more of a front-facing camera or a side-facing camera.

At an operation 804, for example, the image 216 can be stored in the data store 212.

At an operation 806, the preliminary processing module 206 can detect a feature in the image 216. For example, the feature can be detected by executing a semantic segmentation neural network.

At an operation 808, for example, the preliminary processing module 206 can obtain the feature map 218. The feature map 218 can have been produced at a prior time (i.e., at a time prior to the current time) from one or more images.

At an operation 810, for example, the feature map 218 can be stored in the data store 212.

For example: (1) the data store 212 can be disposed on a vehicle and (2) at the operation 808, the preliminary processing module 206 can obtain the feature map 218 at a time in which there is a lack of a production of a propulsion force for the vehicle. For example, the preliminary processing module 206 can obtain the feature map 218 at night when the vehicle is not in operation (i.e., a time in which there is a lack of a production of a propulsion force for the vehicle).

For example: (1) the processor 202 and the data store 212 can be disposed on a vehicle and (2) at the operation 808, the preliminary processing module 206 can obtain the feature map 218 by producing the feature map 218. For example, the preliminary processing module 206 can produce the feature map 218 from images produced by the imaging device 214.

Additionally or alternatively, at the operation 808, the preliminary processing module 206 can obtain the feature map 218 by receiving, by the communications device 210, the feature map 218 from the first cloud computing platform 220. For example, the one or more images used to produce the feature map 218 can have been received, by the first cloud computing platform 220, from a plurality of vehicles. That is, the first cloud computing platform 220 can produce the feature map 218 via a crowdsourcing process.

At an operation 812, the preliminary processing module 206 can determine that the feature in the image 216 corresponds to a feature, of a plurality of features, in the feature map 218.

At an operation 814, for example, the preliminary processing module 206 can determine, based on the feature in the image 216, a region of interest for the feature map 218.

At an operation 816, for example, the preliminary processing module 206 can query, based on the region of interest, the feature map 218 to determine the plurality of features.

For example, the image 216 can include a feature that lacks a corresponding feature in the feature map 218. That is, because the image 216 can have been produced at a current time while the feature map 218 can have been produced at a prior time (i.e., at a time prior to the current time), the image 216 can include a feature that lacks a corresponding feature in the feature map 218.

For example: (1) the data store 212 can be disposed on a vehicle and (2) at the operation 816, the preliminary processing module 206 can query the feature map 218 at a time in which there is a lack of a production of a propulsion force for the vehicle. For example, the preliminary processing module 206 can query the feature map 218 at night when the vehicle is not in operation (i.e., a time in which there is a lack of a production of a propulsion force for the vehicle).

At an operation 818, in a first implementation, the preliminary processing module 206 can produce a segmentation of the image 216 to distinguish the lanes of the road. For example, the preliminary processing module 206 can execute a neural network-based classifier to produce the segmentation.

At an operation 820, in a second implementation, the other electronic road map 224 can be received, by the communications device 210, from the second cloud computing platform 226. For example, the other electronic road map 224 may lack information to distinguish the lanes of the road. Additionally or alternatively, for example, the other electronic road map 224 can include a high definition map. That is, if a location at which the image 216 was produced is a location for which a high definition map exists, then the other electronic road map 224 can include the high definition map.

At an operation 822, in the second implementation, the other electronic road map 224 can be stored in the data store 212.

At an operation 824, in the second implementation, for example, the preliminary processing module 206 can determine a location of the processor 202.

In FIG. 8B, in the method 800, at an operation 826, in the second implementation, for example, the preliminary processing module 206 can determine, based on the location, a region of interest for the other electronic road map 224.

At an operation 828, the neural network training module 208 can produce, from the feature in the image 216 and the plurality of features in the feature map 218, the labeled training map 222. The labeled training map 222 can have information to distinguish lanes of the road. For example, the labeled training map 222 can include one or more of: (1) a polyline representation of a boundary of a lane of the road, (2) a measure of a spatial uncertainty of the polyline, (3) a degree of confidence of an estimation of the boundary of the lane of the road, (4) a probabilistic grid map of the lane of the road, or (5) the like.

In the first implementation, at the operation 828, the neural network training module 208 can produce, from information about the segmentation, the labeled training map 222.

In the second implementation, at the operation 828, the neural network training module 208 can produce, from the other electronic road map 224, the labeled training map 222.

For example, the neural network training module 208 can produce, from the region of interest for the other electronic road map 224, the labeled training map 222.

In a third implementation, at the operation 828, the neural network training module 208 can produce the labeled training map 222 by: (1) producing a potential of an estimation of boundaries of the lanes of the road, (2) producing, based on the potential, the estimation of the boundaries of the lanes of the road, and (3) producing, based on one or more criteria, an evaluation of the estimation of the boundaries of the lanes of the road.

For example, the neural network training module 208 can produce the estimation of the boundaries of the lanes of the road by: (1) determining that a relationship, among one or more of the features in the image 216 or one or more features of the plurality of features in the feature map 218, is expressible as a random field and (2) determining that the random field has one or more Markov properties.

For example, the one or more criteria can include one or more of: (1) a count of members of a set of differences being greater than a count threshold, (2) a degree of curvature of a curve, represented by one or more of the boundaries of the lanes of the road, being within a threshold degree of curvature, (3) a width of a lane, represented by one or more of the boundaries of the lanes of the road, being between a first threshold width and a second threshold width, (4) a position of one or more of the boundaries of the lanes of the road, at a first time, being the position of the one or more of the boundaries of the lanes of the road at a second time (i.e., temporal stability), or (5) the like. The members of the set of differences can be differences between first positions and second positions that are within a distance threshold. The first positions can be of the boundaries of the lanes of the road. The second positions can be of one or more of the features in the image 216 or one or more features of the plurality of features in the feature map 218.

In the third implementation, at the operation 828, for example, the neural network training module 208 can further produce the labeled training map 222 by associating, based on the evaluation, a portion of the boundaries of the lanes of the road with a probability about a degree of accuracy of a position of the portion of the boundaries of the lanes of the road.

In the third implementation, at the operation 828, for example, the neural network training module 208 can further produce the labeled training map 222 by removing, in response to the probability being less than a probability threshold, the portion of the boundaries of the lanes of the road.

At an operation 830, for example, the labeled training map 222 can be stored in the data store 212.

At an operation 832, the neural network training module 208 can train the neural network 228 to produce, in response to a receipt of the image 216 and the feature map 218, the labeled training map 222.

In the second implementation, at the operation 832, the neural network training module 208 can train the neural network 228 to produce, in response to a receipt of the other electronic road map 224, the labeled training map 222.

At an operation 834, for example, the neural network 228 can be stored in the data store 212.

At an operation 836, in a fourth implementation, for example, the preliminary processing module 206 can preprocess, prior to an execution of the neural network 228, the image 216 and the feature map 218. In the second implementation, at the operation 836, the preliminary processing module 206 can preprocess, prior to the execution of the neural network 228, the other electronic road map 224.

For example, the preliminary processing module 206 can preprocess the image 216 and the feature map 218 by: (1) determining, based on the feature in the image 216, a region of interest for the feature map 218 and (2) querying, based on the region of interest, the feature map 218 to determine the plurality of features.

Additionally, for example, the preliminary processing module 206 can preprocess the image 216 by producing a segmentation of the image 216 to distinguish the lanes of the road.

Alternatively or additionally, for example, the preliminary processing module 206 can: (1) determine a location of the processor 202 and (2) determine, based on the location, a region of interest for the other electronic road map 224.

At an operation 838, in the fourth implementation, the neural network execution module 230 can execute the neural network 228 to produce the electronic road map 232. The electronic road map 232 can have information to distinguish lanes of a road.

For example, the neural network execution module 230 can execute the neural network 228 to produce, in response to a receipt of the feature in the image 216 and the plurality of features in the feature map 218, the electronic road map 232.

Additionally, for example, the neural network execution module 230 can execute the neural network 228 to produce, in response to a receipt of information about the segmentation, the electronic road map 232.

Alternatively or additionally, for example, the neural network execution module 230 can execute the neural network 228 to produce, in response to a receipt of information about the region of interest for the other electronic road map 224, the electronic road map 232.

At an operation 840, in the fourth implementation, for example, the electronic road map 232 can be stored in the data store 212.

Figure 9:
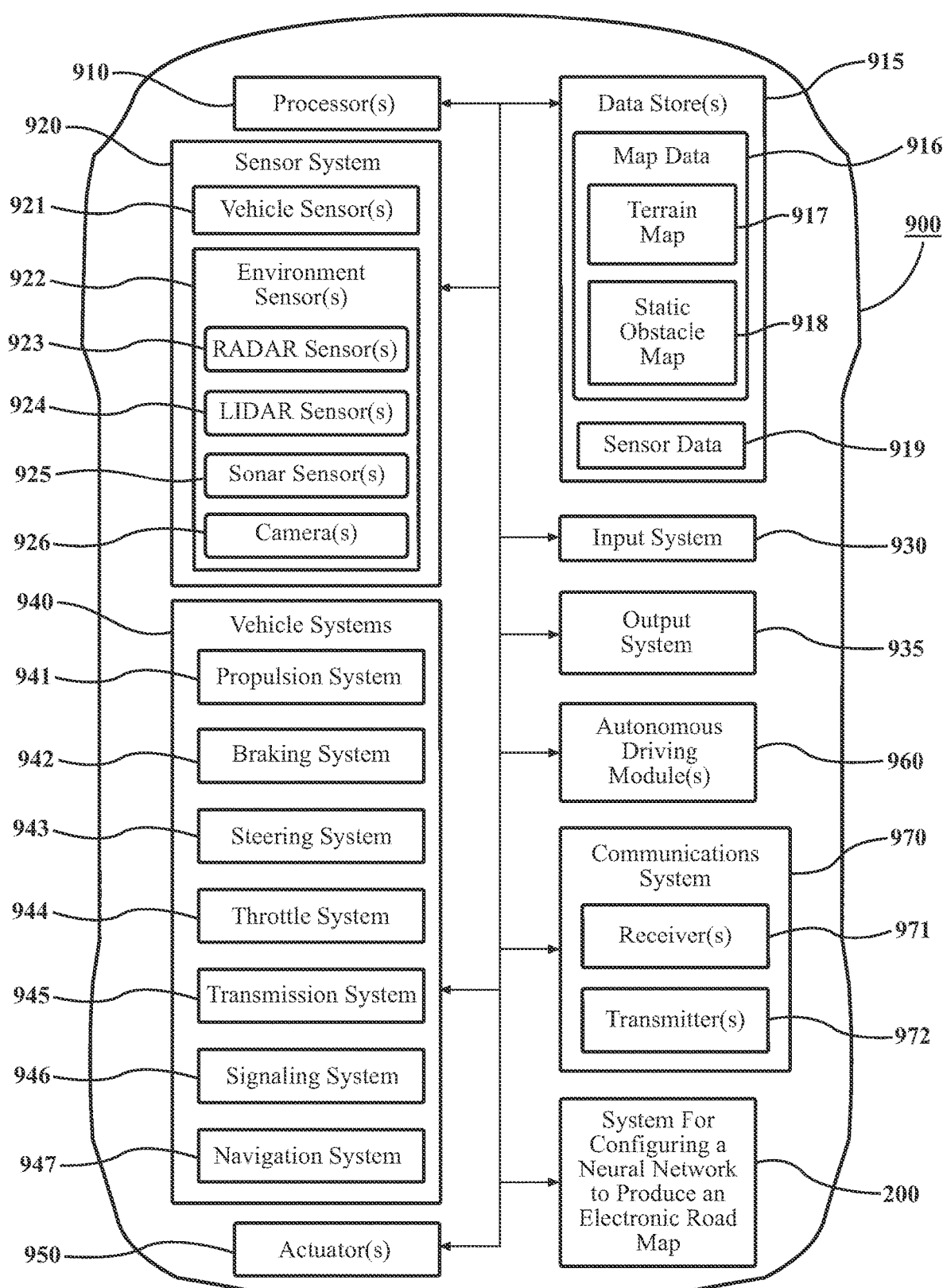
FIG. 9 includes a block diagram that illustrates an example of elements disposed on a vehicle, according to the disclosed technologies.

FIG. 9 includes a block diagram that illustrates an example of elements disposed on a vehicle 900, according to the disclosed technologies. As used herein, a "vehicle" can be any form of powered transport. In one or more implementations, the vehicle 900 can be an automobile. While arrangements described herein are with respect to automobiles, one of skill in the art understands, in light of the description herein, that embodiments are not limited to automobiles.

In some embodiments, the vehicle 900 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 900 is performed according to inputs received from a user (e.g., human driver). In one or more arrangements, the vehicle 900 can be a conventional vehicle that is configured to operate in only a manual mode.

In one or more embodiments, the vehicle 900 can be an automated vehicle. As used herein, "automated vehicle" can refer to a vehicle that operates in an automated mode. As used herein, "automated mode" can refer to navigating and/or maneuvering the vehicle 900 along a travel route using one or more computing systems to control the vehicle 900 with minimal or no input from a human driver. In one or more embodiments, the vehicle 900 can be highly automated or completely automated. In one embodiment, the vehicle 900 can be configured with one or more semi-automated operational modes in which one or more computing systems perform a portion of the navigation and/or maneuvering of the vehicle along a travel route, and a vehicle operator (i.e., driver) provides inputs to the vehicle 900 to perform a portion of the navigation and/or maneuvering of the vehicle 900 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 900 can include various elements. The vehicle 900 can have any combination of the various elements illustrated in FIG. 9. In various embodiments, it may not be necessary for the vehicle 900 to include all of the elements illustrated in FIG. 9. Furthermore, the vehicle 900 can have elements in addition to those illustrated in FIG. 9. While the various elements are illustrated in FIG. 9 as being located within the vehicle 900, one or more of these elements can be located external to the vehicle 900. Furthermore, the elements illustrated may be physically separated by large distances. For example, as described, one or more components of the disclosed system can be implemented within the vehicle 900 while other components of the system can be implemented within a cloud-computing environment, as described below. For example, the elements can include one or more processors 910, one or more data stores 915, a sensor system 920, an input system 930, an output system 935, vehicle systems 940, one or more actuators 950, one or more automated driving modules 960, a communications system 970, and the system 200 for configuring a neural network to produce an electronic road map that has information to distinguish lanes of a road.

In one or more arrangements, the one or more processors 910 can be a main processor of the vehicle 900. For example, the one or more processors 910 can be an electronic control unit (ECU). For example, functions and/or operations of the processors of the processor 202 (illustrated in FIG. 2) can be realized by the one or more processors 910.

The one or more data stores 915 can store, for example, one or more types of data. For example, functions and/or operations of the memory 204, the data store 212, or both (illustrated in FIG. 2) can be realized by the one or more data stores 915. The one or more data store 915 can include volatile memory and/or non-volatile memory. Examples of suitable memory for the one or more data stores 915 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 915 can be a component of the one or more processors 910. Additionally or alternatively, the one or more data stores 915 can be operatively connected to the one or more processors 910 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 915 can store map data 916. The map data 916 can include maps of one or more geographic areas. In some instances, the map data 916 can include information or data on roads, traffic control devices, road markings, structures, features, and/or landmarks in the one or more geographic areas. The map data 916 can be in any suitable form. In some instances, the map data 916 can include aerial views of an area. In some instances, the map data 916 can include ground views of an area, including 360-degree ground views. The map data 916 can include measurements, dimensions, distances, and/or information for one or more items included in the map data 916 and/or relative to other items included in the map data 916. The map data 916 can include a digital map with information about road geometry. The map data 916 can be high quality and/or highly detailed. For example, one or more of the feature map 218, the labeled training map 222, the other electronic road map 224, or the electronic road map 232 (illustrated in FIG. 2) can be realized by the map data 916.

In one or more arrangements, the map data 916 can include one or more terrain maps 917. The one or more terrain maps 917 can include information about the ground, terrain, roads, surfaces, and/or other features of one or more geographic areas. The one or more terrain maps 917 can include elevation data of the one or more geographic areas. The map data 916 can be high quality and/or highly detailed. The one or more terrain maps 917 can define one or more ground surfaces, which can include paved roads, unpaved roads, land, and other things that define a ground surface.

In one or more arrangements, the map data 916 can include one or more static obstacle maps 918. The one or more static obstacle maps 918 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 918 can have location data, size data, dimension data, material data, and/or other data associated with them. The one or more static obstacle maps 918 can include measurements, dimensions, distances, and/or information for one or more static obstacles. The one or more static obstacle maps 918 can be high quality and/or highly detailed. The one or more static obstacle maps 918 can be updated to reflect changes within a mapped area.

In one or more arrangements, the one or more data stores 915 can store sensor data 919. As used herein, "sensor data" can refer to any information about the sensors with which the vehicle 900 can be equipped including the capabilities of and other information about such sensors. The sensor data 919 can relate to one or more sensors of the sensor system 920. For example, in one or more arrangements, the sensor data 919 can include information about one or more lidar sensors 924 of the sensor system 920.

In some arrangements, at least a portion of the map data 916 and/or the sensor data 919 can be located in one or more data stores 915 that are located onboard the vehicle 900. Alternatively or additionally, at least a portion of the map data 916 and/or the sensor data 919 can be located in one or more data stores 915 that are located remotely from the vehicle 900.

The sensor system 920 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 920 includes a plurality of sensors, the sensors can work independently from each other. Alternatively, two or more of the sensors can work in combination with each other. In such a case, the two or more sensors can form a sensor network. The sensor system 920 and/or the one or more sensors can be operatively connected to the one or more processors 910, the one or more data stores 915, and/or another element of the vehicle 900 (including any of the elements illustrated in FIG. 9). The sensor system 920 can acquire data of at least a portion of the external environment of the vehicle 900 (e.g., nearby vehicles). The sensor system 920 can include any suitable type of sensor. Various examples of different types of sensors are described herein. However, one of skill in the art understands that the embodiments are not limited to the particular sensors described herein.

The sensor system 920 can include one or more vehicle sensors 921. The one or more vehicle sensors 921 can detect, determine, and/or sense information about the vehicle 900 itself. In one or more arrangements, the one or more vehicle sensors 921 can be configured to detect and/or sense position and orientation changes of the vehicle 900 such as, for example, based on inertial acceleration. In one or more arrangements, the one or more vehicle sensors 921 can include one or more accelerometers, one or more gyroscopes, an inertial measurement unit (IMU), a dead-reckoning system, a global navigation satellite system (GNSS), a global positioning system (GPS), a navigation system 947, and/or other suitable sensors. The one or more vehicle sensors 921 can be configured to detect and/or sense one or more characteristics of the vehicle 900. In one or more arrangements, the one or more vehicle sensors 921 can include a speedometer to determine a current speed of the vehicle 900.

Alternatively or additionally, the sensor system 920 can include one or more environment sensors 922 configured to acquire and/or sense driving environment data. As used herein, "driving environment data" can include data or information about the external environment in which a vehicle is located or one or more portions thereof. For example, the one or more environment sensors 922 can be configured to detect, quantify, and/or sense obstacles in at least a portion of the external environment of the vehicle 900 and/or information/data about such obstacles. Such obstacles may be stationary objects and/or dynamic objects. The one or more environment sensors 922 can be configured to detect, measure, quantify, and/or sense other things in the external environment of the vehicle 900 such as, for example, lane markers, signs, traffic lights, traffic signs, lane lines, crosswalks, curbs proximate the vehicle 900, off-road objects, etc.

Various examples of sensors of the sensor system 920 are described herein. The example sensors may be part of the one or more vehicle sensors 921 and/or the one or more environment sensors 922. However, one of skill in the art understands that the embodiments are not limited to the particular sensors described.

In one or more arrangement, the one or more environment sensors 922 can include one or more radar sensors 923, one or more lidar sensors 924, one or more sonar sensors 925, and/or one more cameras 926. In one or more arrangements, the one or more cameras 926 can be one or more high dynamic range (HDR) cameras or one or more infrared (IR) cameras. For example, the one or more cameras 926 can be used to record a reality of a state of an item of information that can appear in digital map. For example, functions and/or operations of the imaging device 214 (illustrated in FIG. 2) can be realized by the one or more cameras 926.

The input system 930 can include any device, component, system, element, arrangement, or groups thereof that enable information/data to be entered into a machine. The input system 930 can receive an input from a vehicle passenger (e.g., a driver or a passenger). The output system 935 can include any device, component, system, element, arrangement, or groups thereof that enable information/data to be presented to a vehicle passenger (e.g., a driver or a passenger).

Various examples of the one or more vehicle systems 940 are illustrated in FIG. 9. However, one of skill in the art understands that the vehicle 900 can include more, fewer, or different vehicle systems. Although particular vehicle systems can be separately defined, each or any of the systems or portions thereof may be otherwise combined or segregated via hardware and/or software within the vehicle 900. For example, the one or more vehicle systems 940 can include a propulsion system 941, a braking system 942, a steering system 943, a throttle system 944, a transmission system 945, a signaling system 946, and/or the navigation system 947. Each of these systems can include one or more devices, components, and/or a combination thereof, now known or later developed.

The navigation system 947 can include one or more devices, applications, and/or combinations thereof, now known or later developed, configured to determine the geographic location of the vehicle 900 and/or to determine a travel route for the vehicle 900. The navigation system 947 can include one or more mapping applications to determine a travel route for the vehicle 900. The navigation system 947 can include a global positioning system, a local positioning system, a geolocation system, and/or a combination thereof.

The one or more actuators 950 can be any element or combination of elements operable to modify, adjust, and/or alter one or more of the vehicle systems 940 or components thereof responsive to receiving signals or other inputs from the one or more processors 910 and/or the one or more automated driving modules 960. Any suitable actuator can be used. For example, the one or more actuators 950 can include motors, pneumatic actuators, hydraulic pistons, relays, solenoids, and/or piezoelectric actuators.

The one or more processors 910 and/or the one or more automated driving modules 960 can be operatively connected to communicate with the various vehicle systems 940 and/or individual components thereof. For example, the one or more processors 910 and/or the one or more automated driving modules 960 can be in communication to send and/or receive information from the various vehicle systems 940 to control the movement, speed, maneuvering, heading, direction, etc. of the vehicle 900. The one or more processors 910 and/or the one or more automated driving modules 960 may control some or all of these vehicle systems 940 and, thus, may be partially or fully automated.

The one or more processors 910 and/or the one or more automated driving modules 960 may be operable to control the navigation and/or maneuvering of the vehicle 900 by controlling one or more of the vehicle systems 940 and/or components thereof. For example, when operating in an automated mode, the one or more processors 910 and/or the one or more automated driving modules 960 can control the direction and/or speed of the vehicle 900. The one or more processors 910 and/or the one or more automated driving modules 960 can cause the vehicle 900 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 970 can include one or more receivers 971 and/or one or more transmitters 972. The communications system 970 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 970 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian"

(V2P) technology), or a network (e.g., "Vehicle to Network" (V2N) technology. "Vehicle to Everything" (V2X) technology can integrate aspects of these individual communications technologies. For example, functions and/or operations of the communications device 210 (illustrated in FIG. 2) can be realized by the communications system 970.

The vehicle 900 can include one or more modules, at least some of which are described herein. The modules can be implemented as computer-readable program code that, when executed by the one or more processors 910, implement one or more of the various processes described herein. One or more of the modules can be a component of the one or more processors 910. Alternatively or additionally, one or more of the modules can be executed on and/or distributed among other processing systems to which the one or more processors 910 can be operatively connected. The modules can include instructions (e.g., program logic) executable by the one or more processors 910. Alternatively or additionally, the one or more data store 915 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 900 can include one or more automated driving modules 960. The one or more automated driving modules 960 can be configured to receive data from the sensor system 920 and/or any other type of system capable of capturing information relating to the vehicle 900 and/or the external environment of the vehicle 900. In one or more arrangements, the one or more automated driving modules 960 can use such data to generate one or more driving scene models. The one or more automated driving modules 960 can determine position and velocity of the vehicle 900. The one or more automated driving modules 960 can determine the location of obstacles, obstacles, or other environmental features including traffic signs, trees, shrubs, neighboring vehicles, pedestrians, etc.

The one or more automated driving modules 960 can be configured to receive and/or determine location information for obstacles within the external environment of the vehicle 900 for use by the one or more processors 910 and/or one or more of the modules described herein to estimate position and orientation of the vehicle 900, vehicle position in global coordinates based on signals from a plurality of satellites, or any other data and/or signals that could be used to determine the current state of the vehicle 900 or determine the position of the vehicle 900 with respect to its environment for use in either creating a map or determining the position of the vehicle 900 in respect to map data.

The one or more automated driving modules 960 can be configured to determine one or more travel paths, current automated driving maneuvers for the vehicle 900, future automated driving maneuvers and/or modifications to current automated driving maneuvers based on data acquired by the sensor system 920, driving scene models, and/or data from any other suitable source such as determinations from the sensor data 919. As used herein, "driving maneuver" can refer to one or more actions that affect the movement of a vehicle. Examples of driving maneuvers include: accelerating, decelerating, braking, turning, moving in a lateral direction of the vehicle 900, changing travel lanes, merging into a travel lane, and/or reversing, just to name a few possibilities. The one or more automated driving modules 960 can be configured to implement determined driving maneuvers. The one or more automated driving modules 960 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 960 can be configured to execute various vehicle functions and/or to transmit data to, receive data from, interact with, and/or control the vehicle 900 or one or more systems thereof (e.g., one or more of vehicle systems 940). For example, functions and/or operations of an automotive navigation system can be realized by the one or more automated driving modules 960.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-7, 8A, 8B, and 9, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
    a processor; and
    a memory storing:
        a preliminary processing module including instructions that when executed by the processor cause the processor to:
            detect a feature in an image that was produced at a current time, the image being of a road; and
            determine that the feature in the image corresponds to a feature, of a plurality of features, in a feature map that was produced at a prior time from at least one image, wherein the image includes another feature, but the other feature in the image lacks a corresponding other feature in the feature map; and
        a neural network training module including instructions that when executed by the processor cause the processor to:
            produce, from the feature in the image and the plurality of features in the feature map, a labeled training map that has information to distinguish lanes of the road; and
            train a neural network to produce, in response to a receipt of the image and the feature map, the labeled training map.

2. The system of claim 1, wherein the preliminary processing module further includes instructions that when executed by the processor cause the processor to:
    determine, based on the feature in the image, a region of interest for the feature map; and
    query, based on the region of interest, the feature map to determine the plurality of features.

3. The system of claim 1, wherein:
    the preliminary processing module further includes instructions that when executed by the processor cause the processor to produce a segmentation of the image to distinguish the lanes of the road, and
    the instructions to produce the labeled training map include instructions that cause the processor to produce, from information about the segmentation, the labeled training map.

4. The system of claim 3, wherein the instructions to produce the segmentation include instructions that cause the processor to execute a neural network-based classifier to produce the segmentation.

5. The system of claim 1, wherein:
    the instructions to produce the labeled training map include instructions that cause the processor to produce, from an electronic road map used for training, the labeled training map, and
    the instructions to train the neural network include instructions that cause the processor to train the neural network to produce, in response to a receipt of the electronic road map used for training, the labeled training map.

6. The system of claim 5, wherein the electronic road map used for training lacks the information to distinguish the lanes of the road.

7. The system of claim 5, wherein the electronic road map used for training comprises a high definition map.

8. The system of claim 5, wherein:
the preliminary processing module further includes instructions that when executed by the processor cause the processor to:
determine a location of the processor; and
determine, based on the location, a region of interest for the electronic road map used for training, and
the instructions to produce, from the electronic road map used for training, the labeled training map include instructions that cause the processor to produce, from the region of interest for the electronic road map used for training, the labeled training map.

9. The system of claim 1, wherein the instructions to produce the labeled training map include instructions that cause the processor to:
produce a potential of an estimation of boundaries of the lanes of the road;
produce, based on the potential, the estimation of the boundaries of the lanes of the road; and
produce, based on at least one criterion, an evaluation of the estimation of the boundaries of the lanes of the road.

10. The system of claim 9, wherein the instructions to produce the estimation of the boundaries of the lanes of the road include instructions that cause the processor to:
determine that a relationship, among at least one of the feature in the image or at least one feature of the plurality of features in the feature map, is expressible as a random field; and
determine that the random field has at least one Markov property.

11. The system of claim 9, wherein the at least one criterion comprises at least one of:
a count of members of a set of differences being greater than a count threshold, the members of the set of differences being differences between first positions and second positions that are within a distance threshold, the first positions being of the boundaries of the lanes of the road, and the second positions being of at least one of the feature in the image or at least one feature of the plurality of features in the feature map,
a degree of curvature of a curve, represented by at least one of the boundaries of the lanes of the road, being within a threshold degree of curvature,
a width of a lane, represented by at least one of the boundaries of the lanes of the road, being between a first threshold width and a second threshold width, or
a position of at least one of the boundaries of the lanes of the road, at a first time, being the position of the at least one of the boundaries of the lanes of the road at a second time.

12. A system, comprising:
a processor; and
a memory storing:
a preliminary processing module including instructions that when executed by the processor cause the processor to:
detect a feature in an image that was produced at a current time, the image being of a road; and
determine that the feature in the image corresponds to a feature, of a plurality of features, in a feature map that was produced at a prior time from at least one image; and
a neural network training module including instructions that when executed by the processor cause the processor to:
produce, from the feature in the image and the plurality of features in the feature map, a labeled training map that has information to distinguish lanes of the road, wherein the instructions to produce the labeled training map include instructions that cause the processor to:
produce a potential of an estimation of boundaries of the lanes of the road;
produce, based on the potential, the estimation of the boundaries of the lanes of the road;
produce, based on at least one criterion, an evaluation of the estimation of the boundaries of the lanes of the road; and
associate, based on the evaluation, a portion of the boundaries of the lanes of the road with a probability about a degree of accuracy of a position of the portion of the boundaries of the lanes of the road; and
train a neural network to produce, in response to a receipt of the image and the feature map, the labeled training map.

13. The system of claim 1, wherein the memory further stores a neural network execution module including instructions that when executed by the processor cause the processor to execute the neural network to produce an electronic road map that has the information to distinguish the lanes of the road.

14. The system of claim 13, wherein the preliminary processing module further includes instructions that when executed by the processor cause the processor to preprocess, prior to an execution of the neural network, the image and the feature map.

15. The system of claim 14, wherein:
the instructions to preprocess the image and the feature map include instructions that cause the processor to:
determine, based on the feature in the image, a region of interest for the feature map; and
query, based on the region of interest, the feature map to determine the plurality of features; and
the instructions to execute the neural network to produce the electronic road map include instructions that cause the processor to execute the neural network to produce, in response to a receipt of the feature in the image and the plurality of features in the feature map, the electronic road map.

16. The system of claim 15, wherein:
the instructions to preprocess the image further include instructions that cause the processor to produce a segmentation of the image to distinguish the lanes of the road; and
the instructions to execute the neural network to produce the electronic road map further include instructions that cause the processor to execute the neural network to produce, in response to a receipt of information about the segmentation, the electronic road map.

17. The system of claim 15, wherein:
the preliminary processing module further includes instructions that when executed by the processor cause the processor to:
determine a location of the processor; and determine, based on the location, a region of interest for another electronic road map, and the instructions to execute the neural network to produce the electronic road map further include instructions that cause the processor to execute the neural network to produce, in response to a receipt of information about the region of interest for the other electronic road map, the electronic road map.

18. A method, comprising:

detecting, by a processor, a feature in an image that was produced at a current time, the image being of a road;

determining, by the processor, that the feature in the image corresponds to a feature, of a plurality of features, in a feature map that was produced at a prior time from at least one image, wherein the image includes another feature, but the other feature in the image lacks a corresponding other feature in the feature map;

producing, by the processor and from the feature in the image and the plurality of features in the feature map, a labeled training map that has information to distinguish lanes of the road; and training, by the processor, a neural network to produce, in response to a receipt of the image and the feature map, the labeled training map.

19. The method of claim 18, wherein the labeled training map comprises at least one of:

a polyline representation of a boundary of a lane of the road, a measure of a spatial uncertainty of the polyline, a degree of confidence of an estimation of the boundary of the lane of the road, or a probabilistic grid map of the lane of the road.

20. A non-transitory computer-readable medium for configuring a neural network to produce an electronic road map that has information to distinguish lanes of a road, the non-transitory computer-readable medium including instructions that when executed by one or more processors cause the one or more processors to:

detect a feature in an image that was produced at a current time, the image being of a road;

determine that the feature in the image corresponds to a feature, of a plurality of features, in a feature map that was produced at a prior time from at least one image, wherein the image includes another feature, but the other feature in the image lacks a corresponding other feature in the feature map;

produce, from the feature in the image and the plurality of features in the feature map, a labeled training map that has information to distinguish lanes of the road; and train a neural network to produce, in response to a receipt of the image and the feature map, the labeled training map.

* * * * *